Aug. 4, 1931.  E. M. BEECHER  1,817,341
POLE REENFORCEMENT
Filed Aug. 22, 1927

Inventor
Eldredge M. Beecher
By Rockwell & Bartholow
Attorney

Patented Aug. 4, 1931

1,817,341

UNITED STATES PATENT OFFICE

ELDRIDGE M. BEECHER, OF NEW BRITAIN, CONNECTICUT

POLE REENFORCEMENT

Application filed August 22, 1927. Serial No. 214,681.

My invention relates to a pole reenforcement, and most particularly to a reenforcement suitable for use in reenforcing wooden poles such as those used for the support of electrical conductors, telephone and telegraph wires, and the like.

Poles of the above type are usually inserted in holes in the ground and the useful life of a pole is generally measured by the time required for the rotting off of that portion of the pole which is buried in the ground. In most cases, the rotting proceeds much faster at a point substantially adjacent the surface of the ground, since at this point the pole is subjected to greater changes in the amount of moisture present. Since the butt of the pole is supported by the ground in which it is buried, the greatest strain on the pole comes at the surface of the ground, and it quite often happens that the pole breaks off at this point after a few years' service. The replacement of a pole is rather expensive and various expedients have been proposed to remedy the weakening of the poles in this respect.

Among the most effective means used are those in which two or more reenforcing members are provided adapted to be set into the earth alongside of the poles to which they are tightly clamped. These supports are usually provided with longitudinally extending flanges in order to give them sufficient rigidity, and clamping members which embrace the pole and the supports. The present invention pertains to a device of this sort.

As now known, supports of the above type are either driven into the ground alongside and fairly tightly against the pole, and have their upper ends clamped against the pole, or are clamped to the pole above and below the surface of the earth, it being customary in the latter case to either raise the pole a sufficient distance out of the ground or to excavate around the pole in order that the lower clamping means may be applied. It is in general an object of the present invention to provide a support embodying a structure suitable for use in either of the above manners.

The clamping means for the usual support comprises bolts or straps having threaded ends passing through or around flanges or ribs of the support bodies and nuts received on the threaded ends adapted to draw the supports tightly against the pole. I have found that in practice there is a great tendency where the poles are placed in or near highways, or other places where pedestrians or vehicles pass, for the rough ends of the bolts and clamps to catch in the clothing of the pedestrians, or various portions of passing vehicles, resulting in damage to the clothing or vehicle, or sometimes to the support itself. It is an object of the present invention to provide a support in which the ends of the clamping means are carried within the body of the support, whereby they may not be readily engaged by the clothing of a pedestrian or the like.

In a more specific aspect, it is an object of the present invention to provide a support presenting a substantially smooth exterior surface in which there are no projecting parts.

Another object of the invention is to make reenforcing members stronger than those heretofore used.

Still another object is to provide in a reenforcing member an internal transverse strengthening means which resists bending strains, that may take the form of a cross web, which may be advantageously placed at the ground line and at additional positions in the length of the support if desired.

A still further object is to provide pole reenforcing members which may be readily applied to a pole and which when applied thereto present a smooth sightly appearance.

To these and other ends, the invention consists in the novel features and combination of parts to be hereinafter described and claimed.

Figure 1:
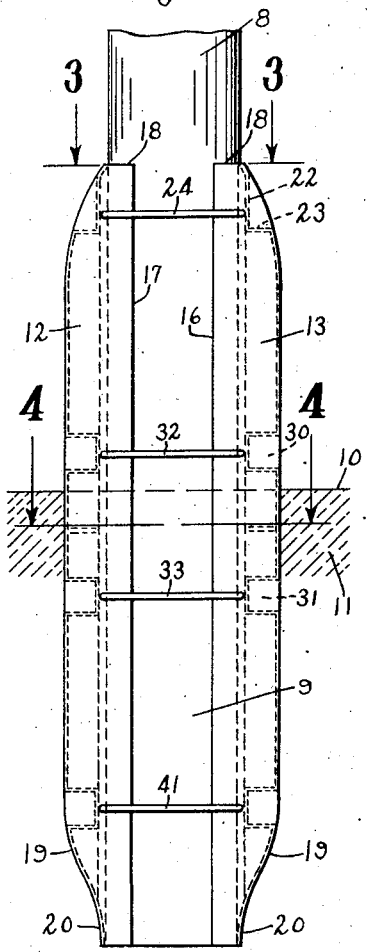
Fig. 1 is an elevational view of a pole, having a reenforcing means, according to my invention, applied thereto.
Figure 2:
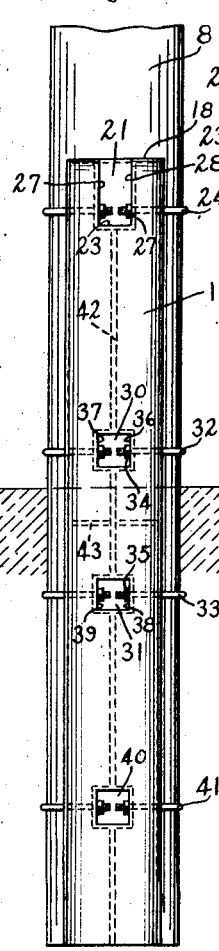
Fig. 2 is a side view of the reenforcing members shown in Fig. 1.

Referring to the drawings in which I have shown a preferred embodiment of my invention, the reference numeral 8 indicates a pole which, although shown broken away, will be understood to extend upwardly to any desired height, and having a butt 9 buried a substantial distance below the surface 10 of the earth 11.

Arranged on opposite sides of the pole 8 are a pair of substantially duplicate supports 12 and 13, each of these supports comprising a hollow shell U-shaped in cross-section, substantially throughout its length, and having two opposite parallel walls 14 and 15 forming the legs of the U, the terminal edges 16 and 17 of the legs 14 and 15 extending preferably but not necessarily in parallel relation to one another throughout the length of the support, and being adapted to bear against and embrace, to a certain extent, the pole 8. The upper end of the outer walls of each of the supports 12 and 13 is curved inwardly and terminates in an edge 18, which closely embraces the pole 8, while the lower ends of the supports 12 and 13 curve inwardly at 19, and then slightly outwardly at 20 to form relatively thin tapered lower edges, for a purpose to be hereinafter pointed out.

Adjacent the upper ends of the supports 12 and 13 are outwardly facing pockets 21, each of the pockets 21 being provided with an inner wall 22, extending longitudinally of the support and spaced slightly from the pole when the support is normally arranged thereon. The pockets 21 are provided with lower walls 23 which extend transversely to the support and pole, for a purpose to be fully described hereinafter.

On either side of the pole 8 are substantially duplicate clamps or bolts 24, having their ends 25, extending through the body of the supports 12 and 13, and into the pockets 21, the terminal portions of the clamps 24 being provided with threads, as at 26, and nuts 27 being received thereon adapted to bear against the side walls 28 and 29 of the pockets 21 to draw the supports tightly against the surface of the pole.

At intermediate points in the supports 12 and 13 are outwardly facing pockets 30 and 31, having received therein clamps 32 and 33 in a manner similar to that in which clamps 24 are received in pockets 21. On the ends of clamps 32 and 33 are nuts 34 and 35, which bear against side walls 36, 37, 38 and 39 of the pockets 30 and 31. Near the lower ends of the supports 12 and 13 are outwardly facing pockets 40, having received therein the ends of clamps 41 in the same manner as in pockets 30 and 31. It will be readily understood that the walls 14 and 15 of the supports 12 and 13 take the place of the ordinary longitudinally extending flanges, but in order to assist the side walls and to give increased rigidity to the supports I have provided flanges 42 which extend longitudinally of the supports in a position parallel to and midway between the walls 14 and 15. The flanges 42 extend inwardly toward pole 8 substantially the same distance as the pockets 21, 30, 31 and 40. At an intermediate point of the supports 12 and 13 and between the pockets 30 and 31 are transverse flanges 43 connecting the walls 14 and 15 together, and preventing relative displacement thereof when the supports are clamped on the pole, and strains applied to the pole.

In use the supports 12 and 13 may be driven into the ground alongside a pole in a position where they bear tightly against the surface of the pole. When used in this manner, the walls 23 of the pockets 21 provide a convenient means for driving, while the relatively thin curved lower portion of the supports ensure that if a support meets an obstruction while being driven, it will not be displaced away from the pole, but, on the contrary, will wedge itself in between the obstruction and the pole. The supports may be driven into the ground until they reach the position shown in Fig. 1, it being preferred that a greater portion of the supports embrace the pole below the surface of the ground than above, owing to the rotted condition of the pole below the surface. The clamps 24 and 32 may now be inserted through the openings provided in the side walls and the nuts 27 and 34 assembled thereon and adjusted to cause the supports 12 and 13 to tightly embrace the surface of the pole.

While the supports or reenforcing means of the present invention are highly effective when used in the preceding manner, I prefer to use them as follows: The earth around the pole is either loosened enough so the pole may be withdrawn or a hole is excavated around the pole to the depth to which the clamping means for the supports are to extend. The supports are then assembled on the pole in proper relation to the weakest portion thereof or, in other words, to that portion of the pole which is opposite the surface of the earth, whereupon the clamps 24, 32, 33 and 41 are inserted in their respective openings in the support body and the nuts assembled thereon. Upon screwing up the nuts the supports will be brought into tight engagement with the pole, whereupon the pole may again be placed in position in the ground and the earth replaced.

It will be noted that when the supports are driven into the ground it is practically impossible to clamp their lower ends against the pole, whereas in the second mode of use both ends may be clamped, thereby preventing the lower ends of the supports from being spread apart due to the pressure of the body of the pole thereon. In either case, however, it will be seen that there are no exposed bolt ends, flanges or other rough means calculated to catch on the clothing of a pedestrian or on a vehicle, these portions of the device being carried within the outer walls, the nuts for the clamps being accessible from the exterior, however.

Figure 6:
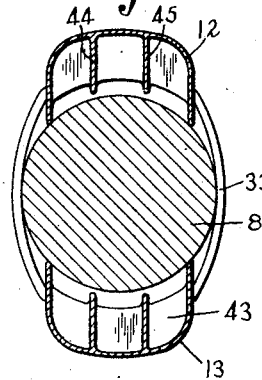
Fig. 6 is a sectional view similar to Fig. 4, but showing a modified form.

In Fig. 6 I have shown a modification in which the flanges 42 of the supports 12 and 13 are replaced with two flanges 44 and 45, it being understood that the number may be increased, if desired.

Figure 7:
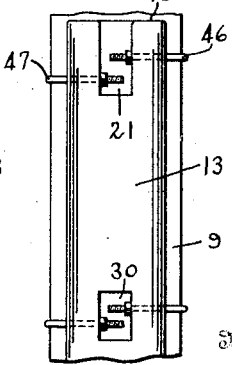
Fig. 7 is a fragmentary view of a modified form.

In Fig. 7 I have shown still another modification in which bolts or clamps 46 and 47 are shown received in the body of the support in staggered relation, it being possible with this arrangement to have longer bolt or clamp ends and a greater amount of adjustability.

Figure 3:
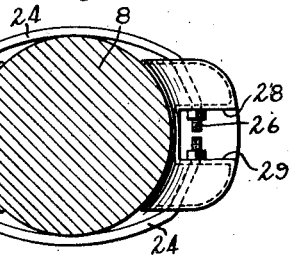
Fig. 3 is a sectional view taken along line 3—3 of Fig. 1.
Figure 4:
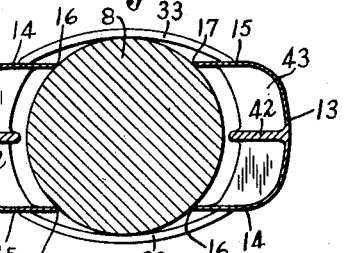
Fig. 4 is a sectional view taken along line 4—4 of Fig. 1.
Figure 5:
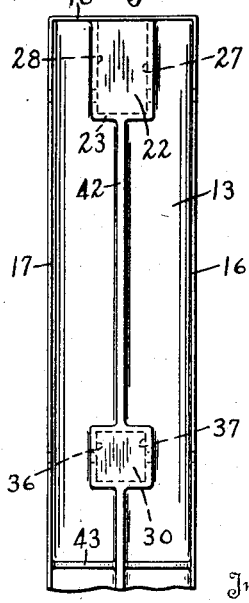
Fig. 5 is an interior view of one of the supports shown in Fig. 1.

As shown in Figs. 3 and 4, the only portions of the supports that are in contact with the pole are the edges. If desired, the clamps may be adjusted so that these edges bite into the pole in order to seat the supports more firmly thereon. The inner walls of the pockets limit the amount that the edges of the supports may penetrate the outer surface of the pole. While I have shown but two supports arranged at opposite points on the pole, it will be understood that any number of these supports may be so arranged at appropriate intervals around the pole; for instance, in certain cases, a single support member may be sufficient.

From the above description it will be readily seen that I have provided a reenforcing means for a pole possessing great strength and adapted to resist bending strains no matter in what direction applied. The structure is such that the device may be readily cast, preferably in malleable iron, and when applied to a pole there are no projecting parts; the exposed portions presenting a smooth appearance and the ends of the clamps, or other fastening means, being carried within the general contour of the outer surface, so that there are no rough parts which may catch on the clothing of pedestrians and the like.

While I have shown and described a preferred embodiment of my invention, it will be understood that the same is not limited to all the details shown, but is capable of modification and variation within the spirit of the invention and the scope of the appended claims.

What I claim is:

1. A reenforcement for poles comprising reenforcing members adapted to be set into the earth at opposite sides of a pole, said members each comprising a body having a transverse section throughout the greater part of its length substantially U-shape in form, the terminal edges of the legs of the U being adapted to bear against the surface of the pole and means for clamping said members to the pole, the ends of said clamping means passing through the bodies of said members and being received within the general contour of the outer surfaces thereof.

2. A reenforcement for poles comprising reenforcing members adapted to be set into the earth at opposite sides of a pole, said members each comprising a body having a transverse section throughout the greater part of its length substantially U-shape in form, the terminal edges of the legs of the U being adapted to bear against the surface of the pole and means for clamping said members to the pole, said clamping means comprising rods extending from one member to the other, the ends of said rods passing through the bodies of the members and being carried within the general contour of the surfaces of the members and nuts on the ends of said rods.

3. A reenforcement for poles comprising reenforcing members adapted to be set into the earth at opposite sides of a pole, said members each comprising a body having a transverse section throughout the greater part of its length substantially U-shape in form, the terminal edges of the legs of the U being adapted to bear against the surface of the pole, outwardly facing pockets formed in said members and means for clamping said members to the pale, said clamping means comprising rods extending from one member to the other, the ends of said rods passing through the bodies of said members and into said pockets and nuts on the ends of said rods within said pockets.

4. A reenforcement for poles comprising a hollow reenforcing member adapted to be set into the ground against the side of a pole, said member having an open side, the edges of which are adapted to bear against the pole, the exposed portion of said member presenting a substantially unobstructed smooth surface, said member being provided with a number of outwardly facing pockets and means for clamping said member to the pole, said means passing through said member and into the pockets.

5. A reenforcement for poles comprising hollow reenforcing members adapted to be set into the ground at opposite sides of a pole, each of said members having an open side, the edges of which are adapted to bear against the pole, the exposed portions of each of said members presenting a substantially unobstructed smooth surface, and means for clamping said members to the pole, said means comprising bolts extending from one member to the other, the ends of said bolts passing through the bodies of the members and having their ends within the general contours of the members, and nuts on the ends of said bolts.

6. A reenforcement for poles, comprising hollow reenforcing members adapted to be set into the ground at opposite sides of a pole, each of said members having an open side, the edges of which are adapted to bear against the pole, the exposed portions of each of said members presenting a substantially unobstructed smooth surface, outwardly facing pockets in said members, and means for clamping said members to the pole, said means comprising bolts extending from one member to the other, the ends of said bolts passing through the bodies of the members and into the pockets, and nuts on the ends of said bolts in said pockets.

7. In a support for a pole, spaced apart walls adapted to extend longitudinally of and outwardly from the pole on which the support is arranged, a wall formed integrally with and connecting said first named walls, said wall being spaced from the pole, said support presenting a substantially smooth outer surface when arranged on the pole, and clamping means for said support, the ends of said clamping means passing through the body of the support and being carried within the general contour of the support.

8. A reenforcement for poles comprising two relatively wide generally parallel walls spaced apart a distance relatively less than the diameter of the poles and adapted to extend longitudinally of and outwardly from a pole, the corresponding edges of the side walls contacting with the pole throughout the length of the reenforcement, a wall formed integrally with and connecting said first named walls at the outer edges thereof, said connecting wall being spaced from the pole when the reenforcement is applied thereto, said spaced apart walls and interconnecting wall forming a continuous uninterrupted outer surface, a longitudinally extending flange integrally formed with said interconnecting wall, said flange extending into the space between said interconnecting wall and pole, and means for securing the reenforcement to a pole.

9. A reenforcement for a pole comprising spaced apart relatively wide walls adapted to extend longitudinally of and outwardly from a pole, a wall formed integrally with and connecting said first named walls at the outer edges thereof, said connecting wall being spaced from said pole when the reenforcement is applied thereto, said spaced apart walls and interconnecting wall forming a continuous uninterrupted outer surface for the reenforcement, an integrally formed transversely extending web connecting said walls together, said web being in the space between said wall and pole, and means for securing said reenforcement to a pole.

10. A reenforcement member adapted to be driven alongside a pole, said member being in the form of a hollow box having an open side which may be applied to a pole, said member having transverse and longitudinal cross-sections generally convex in form whereby the lower end will hug the pole in driving, the outer surface of said member being substantially smooth and uninterrupted, and means including a part extending around the pole and into the interior of the member for clamping said member to a pole.

11. A reenforcement member for a pole, said member being generally hollow and having longitudinally directed side walls, the edges of which may be applied to a pole, said member having a generally convex transverse section and a substantially smooth uninterrupted outer surface and clamping means adapted to pass around the pole and into an interior part of the member and said member being provided with openings through which the ends of the clamping means may be reached from the exterior of the member.

In witness whereof, I have hereunto set my hand this 19th day of August, 1927.

ELDRIDGE M. BEECHER.